United States Patent [19]

Nussbaum et al.

[11] Patent Number: 4,837,424
[45] Date of Patent: Jun. 6, 1989

[54] PROCESS FOR CONDUCTING AND MONITORING THE TEMPERATURE RISE OF ELECTRICALLY HEATED COMPONENTS

[75] Inventors: Max Nussbaum, Ermont; Thierry Picart, Boulogne sur Seine; Jean Sauron, Draveil, all of France

[73] Assignee: Gaz de France, Paris, France

[21] Appl. No.: 133,478

[22] Filed: Dec. 15, 1987

[30] Foreign Application Priority Data

Dec. 23, 1986 [FR] France .................................. 86 18117

[51] Int. Cl.$^4$ ............................................. H05B 1/02
[52] U.S. Cl. .................................... 219/494; 219/506; 219/535; 219/505; 285/286; 285/292
[58] Field of Search ............... 219/494, 497, 505, 506, 219/490, 491, 10.55 B, 535, 546, 549; 285/284, 286, 292

[56] References Cited

U.S. PATENT DOCUMENTS

| | | | |
|---|---|---|---|
| 3,978,306 | 8/1976 | Mori | 219/10.55 B |
| 4,297,568 | 10/1981 | Okatsuka | 219/10.55 B |
| 4,684,789 | 8/1987 | Eggleston | 219/505 |
| 4,705,937 | 11/1987 | Marek | 219/505 |

FOREIGN PATENT DOCUMENTS 2572326 12/1987 France .

Primary Examiner—M. H. Paschall
Attorney, Agent, or Firm—Pollock, VandeSande & Priddy

[57] ABSTRACT

The invention relates to the conducting and to the monitoring, using an automatic machine, of the temperature rise of electrically heated components with which there is associated an identification chart comprising parameters which can be used for conducting and for monitoring this heating, the machine comprising apparatus for reading the chart and for initiating the determined heating program.

According to the invention, the chart is divided into a number of zones into some of which are entered, in addition to the said parameters, additional data concerning some of them, the parameters and their associated data are read off using the said reading apparatus, and provision is made for at least some of these parameters to undergo conversions which are induced by some of the other associated zones as a function at least of the data which are contained therein.

The invention applies particularly to the monitoring of welding together of plastic components.

3 Claims, 1 Drawing Sheet

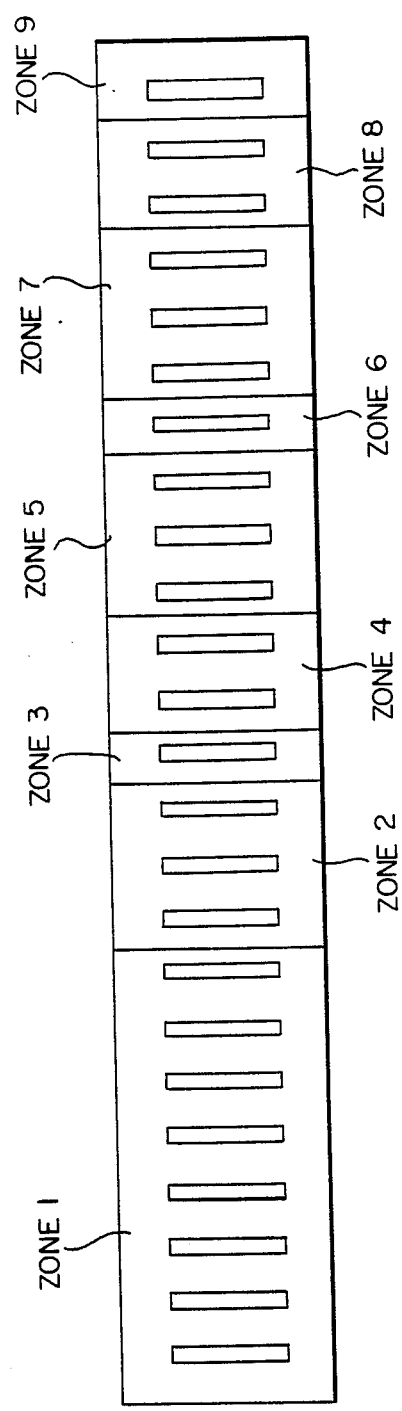

PROCESS FOR CONDUCTING AND MONITORING THE TEMPERATURE RISE OF ELECTRICALLY HEATED COMPONENTS

FIELD OF THE INVENTION

The invention relates to a process for monitoring, by means of an automatically controlled machine, the temperature rise of electrically heated components.

The process of the invention is intended, in particular, to make it possible to perform automatic welding together of plastic components.

PRIOR ART

Anyone interested, for example, in the field of gas distribution will note that at the present time the increasingly widespread employment of plastic pipes, particularly for producing distribution networks, involves certain constraints when the pipes are assembled together. Since these pipes are, in fact, not very suitable for adhesive bonding, they must be heat-welded if a satisfactory assembly which fulfills all the required safety conditions is to be ensured.

However, on the market today there are a number of manufacturers of such components, particularly of plastic material such as polyethylene, which are intended to be assembled in this manner. In practice, each manufacturer has established his own rules for welding his components under optimum conditions. Thus, the user who is liable to be obliged to use components originating from different manufacturers or belonging to the same manufacturer but originating from ranges which may have changed, is confronted with problems of modifications or of adapting his own welding standards as a function of the type of hardware which he employs.

In order to permit a welding, or more generally a monitoring of the temperature of the components, whatever the type of hardware employed, there has already been proposed a process in which:

an identification chart containing parameters which can be used for monitoring is associated with the components to be monitored, and the machine is provided with means for reading the said chart and for implementing, on the machine, a monitored heating program, as a function of the said read parameters.

A process of this kind corresponds substantially to that of French patent application No. 84/16,691, filed on Oct. 31, 1984 by the present applicant.

The process and the machine described in this application made it possible, in fact, to avoid the difficulty inherent in having a continuously updated list of available components and of each manufacturer's specifications, the components being identified unequivocally, where their use is concerned.

However, this process and this machine were intended exclusively for automatically welding together plastic components.

SUMMARY OF THE INVENTION

The process of the present invention, which may, in particular, be employed to this end while offering the same advantages, can also, in a more general manner, make it possible to define and to monitor the parameters which can be used for verifying the heating of components, by adapting precisely these parameters as a function of the real use conditions which are encountered.

More specifically, the process of the invention is one in which:

the identification chart of the components is divided into a number of distinct zones in at least some of which are entered, in addition to the said monitoring parameters, additional data at least some of which are associated with at least one of the parameters, the parameters and/or the data contained therein are read off, through the intermediacy of the reading means, in each of the zones, this being done successively in a determined order, and provision is made for at least some of the said parameters read in the corresponding zones to undergo conversions which are induced by at least some of the other associated zones as a function of the said additional data which are contained therein.

The advantage of the process of the invention will become more clearly apparent with the aid of an example.

In the case where the invention is applied to the welding of two plastic pipes, provision is frequently made for assembling them by means of sleeves which comprise an electrical winding on their inner face, the welding operation being performed by connecting the winding to an electrical source which will heat it and cause the fusion of the plastic of the sleeve and of the pipe.

Let us now consider the parameter "resistance R of the sleeve" (this parameter and the value which is attributed to it by the manufacturer being entered in at least one determined zone of the chart).

In practice, the value of this parameter is substantially a function of two criteria:

on the one hand, the manufacturing tolerance of the resistant member of the sleeve, and on the other hand, the variation of its ohmic value which is related to the nature of the resistant wire and which is a function of temperature.

In fact, these two criteria will affect the theoretical ohmic value of the sleeve placed in an ambient temperature which is different from the mean reference temperature (for example 20° C.).

Now, the value of the "resistance" parameter which has been expressed in the corresponding zone of the chart corresponds to this theoretical ohmic value.

In order to correct the value of the resistance to be taken into account by the means for implementing the program for monitoring ahd heating the machine, a permissible tolerance will be defined, in the present case, as a function of the cumulative sum of the two abovementioned criteria of influence.

The specified tolerance, also entered in a determined zone of the chart, for example in a form corresponding to a permissble percentage of errors, will be taken into account during the calculation of the comparison established between the theoretical value of resistance at 20° C. and the real value of this resistance under the effective conditions of heating and of monitoring.

It will be noted that, for certain parameters, this real value may be supplied and entered into an analog/logic stage of the machine by a means external to the chart, such as a probe or a sensor.

In relation with this example, the process of the invention provides, effectively:

means external to the chart and intended to read off directly on the component at least one additional parameter which can be used for conducting and monitoring the heating of this component, and means for entering this additional parameter in the machine, this process also providing:

for at least some of the parameters entered in the chart to be considered as reference parameters, and for at least some of the additional data which are contained in this chart to react with the said reference parameters with which they are associated, as a function of the value of the additional parameter which has been read off, so as to supply the means for implementing the program of monitoring and of heating of the machine with a corrected parameter which takes account of the real conditions encountered in the field.

BRIEF DESCRIPTION OF THE DRAWING

The FIGURE shows an identification chart which is divided into zones, each of which contains one or more characters as will be described below.

The invention will appear more clearly from the description which follows.

DETAILED DESCRIPTION

Since the process of the invention is particularly intended to make possible the controlled welding together of two components, this description will, by way of example and without any limitation being implied, refer to this particular application of the invention.

It has already been stated in the preamble that two members, such as two polyethylene pipes, can be united by means of a sleeve, also made of polyethylene, which will be heat-welded astride the two abutting ends of the two pipes.

In a conventional manner, the ends of the electrical winding of the sleeve are accessible via two supply terminals.

As has been described in French patent application No. 84/16,691, mentioned above, the suitable temperature rise for producing a good welding of the two pipes and of the sleeve depends essentially on the characteristics of this sleeve and especially on the following parameters: diameter of the sleeve, its wall thickness, resistance of the incorporated electrical winding, and the like.

All these parameters, which dictate the conditions for executing the program of welding, that is to say of heating and of monitoring the temperature rise, which is essentially a function of the period and of the power of the electrical heating, are indicated on an identification plate or chart attached to or carried by the sleeve. This identification plate may be particularly of the bar code type (and hence readable by an optical pencil or by a laser).

In the French application in question provision was made for an optical pencil connected to an analog/logic processing stage permitting the entry of the identification data into the machine.

Furthermore, provision was made for an external means of reading off an additional parameter. This means consisted of a heat probe whose temperature sensor determined the real effective temperature of the component at the outset of the welding. The heat probe was connected to the machine so as to permit the introducton of this additional temperature parameter into the processing stage of this machine.

The means for performing the program of welding (and hence of monitored heating), for their part, consisted of a programming circuit determining the characteristics of the program of welding to be applied, as a function of the parameters originating from the chart and from the heat probe. This welding program determined the regulation of an electrical welding source connected to the processing stage in order to apply the determined required electrical energy to the components to be welded.

Although, in the application to the welding under consideration, the process of the present invention employs the general structure and the means provided in the machine which is the subject of the prior application in question, these will not be described more thoroughly here, since they do not form the subject of the present invention.

However, reference will be made to this application, if need be, for further detail.

On the basis of the means just referred to, the process of the invention is distinguishable in that it provides for dividing the identification chart joined to the component to be heated into a number of distinct zones in at least some of which are entered, in addition to the said parameters which can be used for conducting and monitoring this heating, the additional data relating to these parameters and permitting them to be acted upon.

The parameters and/or the data which are contained in the various zones are then read off, this being done successively in a determined order, in this case by virtue of the optical pencil.

Furthermore, provision is made for the additional data entered in the chart to react with the parameters with which they are associated by regulating them, that is to say by correcting them.

In the application being considered, provision is even made for at least one of the parameters entered (such as the theoretical resistance of the component) to be considered as a reference parameter and to be subjected to a "servo control" based on the data which are associated with it in a zone being considered, and as a function of the value of an additional parameter such as the real temperature or resistance. A corrected parameter is then supplied to the means for implementing the machine control program.

In fact, the parameters under servo control will consist of the power of the electrical heating employed, the current and the voltage delivered, of the heating period and of the theoretical and/or real temperature of the component to be heated and to be monitored.

In order to clarify the description, a presentation will now be made, still by way of example, of, on the one hand, an identification chart structure which may be employed and, on the other hand, in conjunction with this structure, its general principle of operation.

The identification chart envisaged is of the bar-code type with 24 characters. It can be read by a manual optical pencil. The parameters which are servocontrolled or monitored are the voltage, current or power of the electrical heating delivered, the period during which this voltage, current or power is delivered, and the temperature of the component.

The 24 characters carried by the identification chart are divided into nine distinct principal zones. The first zone comprises the first 8 characters and makes it possible, on the one hand, to define the references of the manufacturer of the component and, on the other hand, to enter additional data which can be used for the recognition, for monitoring of the component and for the selection of the way of correcting the parameters as a function of the data contained in the chart or of an external parameter (such as the temperature read off by the probe).

The second zone comprises three characters which define the diameter of the component under consideration.

The third zone, which comprises one character, defines the type of regulation chosen by the designer of the component, it being possible for this regulation to be carried out by controlling the voltage, current or power.

The value of this character also determines the unit in which the theoretical value of a determined parameter of the component to be heated (in this case the sleeve) should be considered by the machine.

The fourth zone comprise two characters which make it possible to determine the nominal value of the regulation which has been defined in the preceding zone.

The fifth zone comprises, in its turn, three characters which may correspond either to the mean value of a parameter obtained during manufacture, or to a theoretical value used to establish a real control value and which will be effectively employed by the machine's program so as to verify a determined parameter of the sleeve. (This point will be dealt with again later.)

To sum up, it may be considered that this zone defines the value of the characteristic of the sleeve which is defined in the third zone, this characteristic acting as a reference parameter.

The sixth zone comprises a character which defines a corrective coefficient. This corrective coefficient, which thus constitutes an additional datum entered on the chart, is intended to perform a "correction" to the value of the parameter inscribed in zone 5, this being done either as a function of an additional parameter calculated by a computing unit, or of an external parameter supplied by the heat probe in the case being considered.

The seventh zone, which comprises three characters, defines the envisaged heating period. In the present case, this period is expressed in seconds or in minutes.

The eighth zone comprises two characters which define the value of the correction to be made to the period, the voltage or the power of heating, as a function of the temperature of the component, (calculated, or read off by the heat probe).

Lastly, the ninth zone comprises a single character whose attributed value constitutes as known per se, the control digit or key for proper reading of the chart.

From this first presentation of the envisaged organization of the chart it follows therefore that it is possible to perform verification procedures of a defined characteristic or parameter of the component being considered, namely a correction or an adaptation to the component being considered of the energy being delivered by the electrical source employed for heating the component to a suitable and desired temperature.

The organization of the various zones of the chart and their principle of interaction will now be described in succession and in greater detail.

ZONE 1

The eight characters in this zone make it possible to express:

1. The manufacturer's references, which are denoted by two numerical characters.

It will be noted that this manufacturer's reference makes it possible to verify the origin of the components employed.

2. Each first, third, fifth and seventh odd character makes it possible to enter an additional datum in the chart by adding a determined arbitrary value, which has been chosen equal to 0, 3 or 6, to the character under consideration.

In the present case:

the first character defines the type of components employed (sleeve, pipe, etc.);

the third character defines the parameter to be corrected (for example the period of heating or power delivered by the electrical source) as a function of another parameter (particularly temperature of the component provided by the probe);

the fifth character defines the nature of the welding cycle. It may also provide an additional datum capable of acting on a determined parameter (see case of the eighteenth character, zone 6).

The seventh character defines the temperature range envisaged by the manufacturer.

EXAMPLE

First Character

Value of the information added to the numerical coded character being considered 0 = male or seat
3 = sleeve or female
6 = electrical heating accessory other than electrically weldable.

Third Character

Value of the information added

0 = U (voltage) or I (current) which are regulated with a time correction
3 = U or I regulated with a power correction
6 = power regulation.

Fifth Character

Value of the information added
0 = uniform welding cycle

| 3 = | other cycle |
| 6 = | |

Seventh Character

Value of the information added
0 = first temperature range permitted by the manufacturer of the component.
3 = second temperature range
6 = third temperature range Additional information can thus be entered in the first zone of the bar code, with three possibilities.

EXAMPLE

Manufacturer LINO GAZ

Abbreviated logo LINO

In their encoded form, these letters have the value

L = 12  I = 09  N = 14  O = 15

If the 8 assembled characters of this first zone read 12391465 then the entry will be:

the information "male or seat" given by the first character (addition of the value "0" to this first character), the information "U or I regulated with a power correction" (given by the third character addition of "3").

the information "uniform welding cycle" given by the seventh character (addition of "6" to this seventh character).

ZONE TWO

The second zone concerns the characters 9, 10 and 11.

These characters define the diameter of the component being considered. The diameter written down corresponds, in the case of a sleeve, to the outer diameter of the pipe onto which it has to be adapted.

Two ranked ranges have been defined.

1. The diameter of the component is expressed in millimeters.

The numbers which may be used are: 001 to 799.
The character no. 9 shows hundreds of mm
The character no. 10 shows tens of mm
The character no. 11 shows units of mm.

EXAMPLE $\phi 20$ mm = 020, $\phi 110$ mm = 110

2. The diameter of the component is expressed in inches.

In this case the numbers which may be used are: 800 to 999
The character no. 9 shows tens of inches
The character no. 10 shows units of inches
The character no. 11 shows fractions of an inch
According to the code:
0 = whole inch
1 = $\frac{1}{4}$ inch
2 = $\frac{3}{8}$ inch
3 = $\frac{1}{2}$ inch
4 = $\frac{3}{4}$ inch

EXAMPLE $\phi 1'' = 810$, $\phi 1''\frac{1}{4} = 811$

It will be noted that the value 000 may be employed for the accessories whose diameter cannot be defined.

ZONE 3

The character contained in this zone 3:

1. allows the regulation mode (voltage, current, etc.) to be defined as a function of the value of the datum added to the third character in zone 1. The value attributed to the regulation mode chosen is written down in zone 4. This value may also be calculated using a computing unit (see zone 6).
In U mode: voltage control volt per volt
In I mode: current control ampere per ampere
In P mode: power control based on the parameter
U in the case of power calculation using the formula $U^2/R$
I for power calculation using the formula $RI^2$ 2. shows the position of the comma in the nominal value of the parameter characterizing the component to be heated.

In this case, this characterizing parameter corresponds to the component's resistance (R).

EXAMPLE

| U | I |
|---|---|
| 1 : Ω | 4 : Ω |
| 2 : , Ω | 5 : , Ω |
| 3 : , Ω | 6 : , . Ω |

After this character has been read, knowledge is available of, on the one hand, the regulation mode of the electrical supply which is chosen and, on the other hand, of the unit (Ω, tenth of Ω to hundredth of Ω) of the characterizing parameter selected.

ZONE 4

According to the mode U, I or P, etc., expressed by character 12 (preceding zone 3), the characters 13, 14 of this zone 4 stipulate the value of the regulation parameter chosen.

U MODE

The digits entered into these characters 13 and 14 express, uncoded, the value of the nominal effective voltage which is chosen and kept constant during the heating time at the entry terminals of the sleeve winding.

EXAMPLE 35 volts
Character 13 = 3
Character 14 = 5

I MODE

The values attributed to characters 13 and 14 then express, uncoded, the current value chosen and kept constant during the heating period.

EXAMPLE 4 amperes
Character 13 = 0
Character 14 = 4

As will be appreciated, the units chosen are, in this case, the volt for U and the ampere for I.

The power parameter (P, in watts) could similarly be chosen.

ZONE 5

Zone 5 comprises three characters 15, 16, 17 into which is entered a datum relating to the characterizing parameter of the component selected using character 12 (zone 3).

In the case where the characterizing parameter is the component's resistance, the three digits entered into the characters 15, 16 and 17 respectively show the reference value of this characterizing parameter.

This three-digit number has been arbitrarily chosen to express the value of the resistance of the component (sleeve) at an average temperature of 20° C.

EXAMPLE

Character 12 = 1
Character 15-16-17 = 300
From this it is deduced that R = 300 Ω (ohm)

The datum entered in this zone 5 may, in particular, correspond to the mean value of a parameter generally obtained during manufacture or else to a theoretical value used to establish, as will be seen later, a "cotrol"

value employed for checking a parameter of the component.

It will be noted that when the number 000 is entered in this zone, this means that the characterizing parameter R is not taken into account.

ZONE 6

In this zone 6, which consists of the eighteenth character of the bar code, a datum is entered which relates to the characterizing parameter whose value has been fixed by the fifteenth, sixteenth and seventeenth characters (zone 5).

The encoded value which is attributed to character 18 makes it possible to give an error margin or a deviation tolerance which the means of programming or controlling the machine may permit between the theoretical value of the characterizing parameter originally entered on the chart and its "real" value determined either from the reading of the component's temperature by the heat probe, or from its internal calculation controlled using a computing unit (see Note).

In our example, since the characterizing parameter is R (resistance of the component or sleeve), the internal calculation of the "real" value is carried out on the basis of a comparison between the theoretical value of the parameter R and its value as measured by an external means (particularly an ohmmeter).

If the deviation between the real value and the theoretical value of the parameter being considered is within the datum "permissible tolerance" in character 18, then the means of programming of the machine do not take this deviation into account and operate on the basis of the theoretical value supplied when the zone is being read.

On the other hand, if the permissible tolerance is exceeded, the welding operation is stopped.

EXAMPLE

Digits and corresponding percentages expressed using this eighteenth character.
1=±6%
2=±8%
3=±10% etc.
9=see note
0=not taken into account The percentages are established so as to take into account the resistance changes as a function of the work site temperature.

NOTE: the case of digit 9.

In this case, the direct measurement of the component's real temperature by an external means (heat probe) is withheld and is replaced by the calculation, in the machine, of this temperature compared with the theoretical value of the resistance written down in zone 5 (in relation with zone 3) at 20° C., and of its real value measured, for example, using an ohmmeter, at the component's temperature. The temperature parameter is thus determined indirectly.

ZONE 7

Zone 7 comprises three characters 19, 20 and 21.

The values attributed to these characters express the period of heating of the component.

The time may be expressed in seconds. The digits ranging from 003 to 899 will then be employed, for example. The characters 19, 20 and 21 express hundreds, tens and units of seconds, respectively.

The time may also be expressed in minutes. Digits ranging from 900 to 999 will then be employed. The 9 of character 19 is then no longer significant. The characters 20 and 21 express tens and units of minutes, respectively.

Provision may be made so that for a determined value, for example 000, the heating (or welding) time is not predefined in the bar code. The stoppage of the welding operation which is in progress can then be determined by an external sensor which will interrupt the machine's operation at the time when the desired temperature has been reached.

ZONE 8

The characters 22 and 23 of the bar-code chart form the zone 8.

This zone is intended to correct the energy delivered by the electrical source.

In the case which is envisaged, the corrected parameters are the heating time or power, this correction being established as a function of the component's temperature which is calculated or read off by the heat probe.

By correcting the delivered initial energy in this manner, the welding quality is kept optimized whatever the weather conditions encountered.

In practice:

if the probe records a temperature of about 20° C., a correction will then be nil;

below 20° C., it is accepted that a percentage of positive corrections of the time or power parameter, per degree C., is fixed;

above 20° C., it is accepted that a percentage of negative corrections of the initial parameter is fixed, also per degree C.

It will be recalled that the time or power parameter to be corrected has been chosen when the value of the third character (zone 1) is attributed.

EXAMPLE

1. Character 22: digit 2 to 9
Character 23: digit 2 to 9

The encoded data contained in these characters, which relate either to the heating time or to the power, are considered to express a correction in tenths of percent per degree C.

2. Character 22=0
Character 23=0

The datum "00" means that there is no time or power correction to be taken into account. Consequently, these parameters are not converted.

A temperature reading by the heat probe is then unnecessary.

3. Character 22=1
Character 23=1

The datum "11" also shows the machine that no time or power regulation needs to be provided. Here again, therefore, these parameters are neither converted nor modified.

Temperature readings or calculations are not envisaged in this case either.

ZONE 9

Zone 9 comprises the twenty-fourth and last character of the bar code.

This twenty-fourth character shows that the message has been completely read by the optical pencil and is recognized as significant.

Since the monitoring procedure is known per se and does not form the subject of the invention, it will not be described.

From the preceding example it can be deduced, therefore, that the process of the invention makes it possible, according to the additional data entered in the corresponding zones of the bar code:

either to define the type or the mode of regulation (U, I or optionally P, or the like) of the heating (welding) energy delivered by the electrical source, or to monitor the reference value which has been chosen (see the example considered above, where the resistance R of the sleeve is used).

In synthesis, the process of the invention may therefore be defined as follows:

nents, first additional data relating to the actual state of said components and process data;

(c) establishing a sequence for machine-reading data in said zones;

(d) machine-reading said data in said zones in said sequence;

(e) providing directly on said plastic components second additional machine-readable data relating to a further actual physical state of said plastic components, and machine-reading said second additional data;

(f) modifying data read in at least some of said zones on the basis of said first additional data contained and read in at least some of the other of said zones and of said second additional data read directly on said plastic components; and, (g) heating said components in accordance with said modified data for welding together said components.

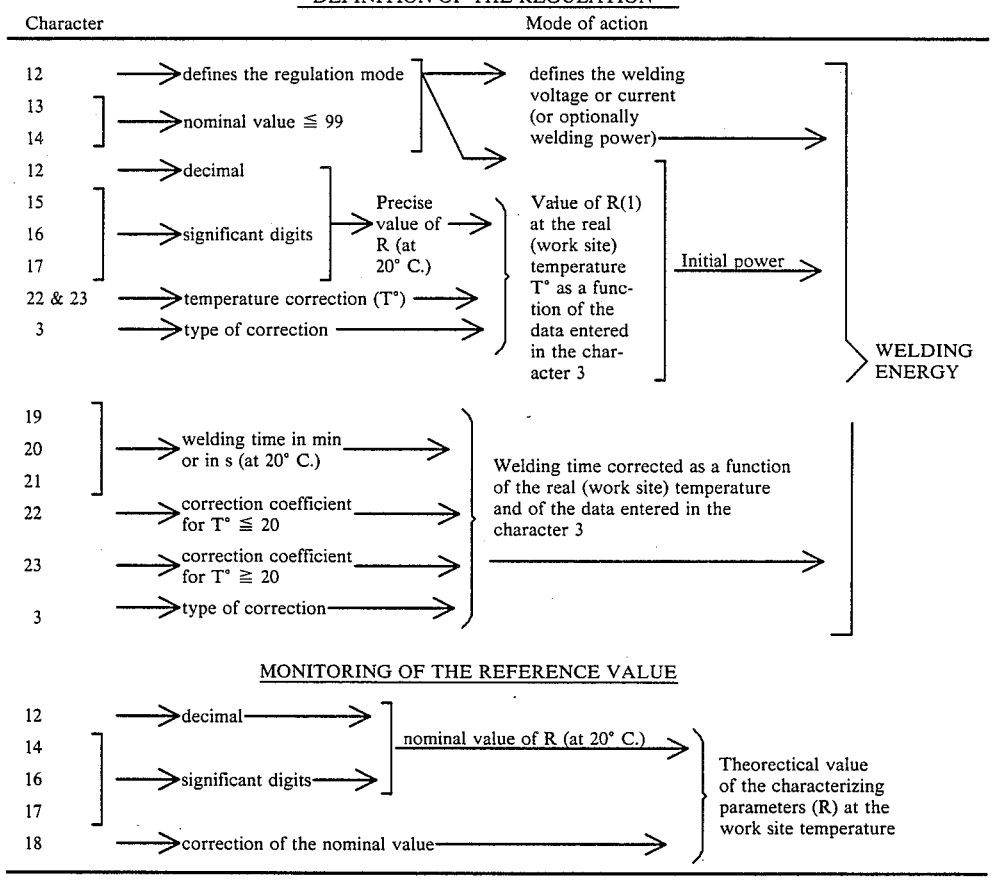

Note: the nominal reference temperature (T°) has been arbitrarily taken as being 20° C. (1) R = characterizing parameter "resistance of the component" considered

What is claimed is:

1. A process for conducting, monitoring and controlling the rise in temperature of electrically-heated plastic components to be welded together by an automatically-controlled welding machine, said process comprising:
    (a) providing a heating control chart, said chart comprising a plurality of zones, each of said zones occupying a separate, distinct area on said chart;
    (b) entering machine-readable data in at least some of said zones, said data comprising primary data relating to a reference physical state of said compo- 2. A process in accordance with claim 1 wherein data are provided in at least one of said zones for determining the temperature of said component independently of a direct temperature measurement by a means external to said chart.

3. A process in accordance with claim 1 including a step of sensing the temperature of the electrically-heated component with a heat probe.

* * * * *

UNITED STATES PATENT AND TRADEMARK OFFICE
CERTIFICATE OF CORRECTION

PATENT NO. : 4,837,424

DATED : June 6, 1989

INVENTOR(S) : Max Nussbaum, et al.

It is certified that error appears in the above-identified patent and that said Letters Patent is hereby corrected as shown below:

<u>On the title page</u>:

In the Abstract, line 16, after "least" insert --some--.

Column 2, line 47, change "ahd" to --and--;

line 53, change "permissble" to --permissible--.

Column 5, line 15, change "comprise" to --comprises--.

Column 8, line 68, change "cotrol" to --control--.

Column 11, under the heading "MONITORING OF THE REFERENCE VALUE", change "14" to --15-- and change "Theorectical" to --Theoretical--.

Signed and Sealed this

Seventh Day of January, 1992

Attest:

HARRY F. MANBECK, JR.

*Attesting Officer*  *Commissioner of Patents and Trademarks*